United States Patent [19]

Nelson

[11] 4,015,077

[45] Mar. 29, 1977

[54] FACSIMILE TRANSMITTER HAVING IMPROVED RESPONSE

[75] Inventor: Richard L. Nelson, New York, N.Y.

[73] Assignee: Exxon Research and Engineering Company, Linden, N.J.

[22] Filed: Aug. 21, 1975

[21] Appl. No.: 606,507

[52] U.S. Cl. .......................... 358/280; 178/DIG.2; 178/DIG. 27
[51] Int. Cl.² ......................................... H04N 1/02
[58] Field of Search ........... 178/DIG. 27, 6, DIG. 2

[56] References Cited

UNITED STATES PATENTS

| | | | |
|---|---|---|---|
| 2,506,672 | 5/1950 | Kell | 178/DIG. 2 |
| 3,600,506 | 8/1971 | Richeson | 178/6 |
| 3,619,493 | 11/1971 | Krallinger | 178/6 |
| 3,761,610 | 9/1973 | Krallinger | 178/6 |
| 3,845,242 | 10/1974 | Richeson | 178/6 |
| 3,868,477 | 2/1975 | Katzman | 178/6 |
| 3,887,939 | 6/1975 | Hunt | 178/DIG. 2 |

OTHER PUBLICATIONS

Kodak Filters for Scientific and Technical Uses, 1973, p. 70.

Primary Examiner—Robert L. Griffin
Assistant Examiner—Michael A. Masinick
Attorney, Agent, or Firm—Norman L. Norris

[57] ABSTRACT

A facsimile transmitter detects dark-light variations in an illuminated document by means of a photodetector. Fiber optics form an optical path from the illuminating means to the document and from the document to the photodetector means with filter means being located in the optical path for attenuating light in the near infrared region of the spectrum. Amplifier means are coupled to the photodetector means and automatic gain control means are associated with the amplifier means for increasing the gain of the amplifier in response to a lesser amount of light detected by the photodetector. The gain control means is adjustable so as to limit the increase in gain when detecting dark regions. Lead networks are coupled to the amplifier means to increase the speed of response to dark-light variations in the document.

18 Claims, 8 Drawing Figures

FACSIMILE TRANSMITTER HAVING IMPROVED RESPONSE

BACKGROUND OF THE INVENTION

This invention relates to facsimile transmitters of the type utilized in facsimile systems including a transmitter, a receiver and a communications network therebetween. More particularly, this invention relates to facsimile transmitters wherein a document is scanned so as to generate electrical information-bearing signals representing the dark-light variations in the document. These information-bearing signals may then be transmitted over the communications network to a facsimile receiver where the information-bearing signals are converted to marks or images on a copy medium so as to form a copy which is a reasonable facsimile of the original document.

In commercially available, prior art facsimile transmitters manufactured by the assignee of this invention, the amplifier portion of the transmitter is provided with an automatic gain control so as to permit an increase in gain of the amplifier when a diminished amount of light is detected by the photodetecting means of the transmitter. In other words, the automatic gain control of the amplifier means permits a correction in the gain of the amplifier when, due to a malfunction such as reduced illumination of the document or decreased sensitivity of the photodetector, the signal generated by the photodetector appears as a signal representing the detection of a darker region on the document. This is of course desirable in that any malfunction in the transmitter is corrected even though that malfunction may be of a relatively minor nature, e.g., the illuminating means in communication with the document at the transmitter becomes covered with dust or other debris. However, automatic gain control of this type is undesirable in that the detection of an actual dark region on the document can result in the adjustment of gain for the amplifier which will make the actual dark region appear as a white region. This phenomenon may be better understood with reference to copending application Ser. No. 417,797 filed Nov. 21, 1973 now U.S. Pat. No. 3,911,207 which is assigned to the assignee of this invention.

As shown in the aforesaid application, the automatic gain control comprises a feedback path including a fixed resistance in parallel with an electronically controlled resistance comprising an FET (field effect transistor). The FET resistance is controlled or adjusted in response to the charge on the capacitor which is coupled to the output of the amplifier through a transistor. When the transistor is conductive as during detection of a white signal, an increased positive charge on the capacitor renders the FET conductive so as to reduce the feedback resistance thereby minimizing the gain of the amplifier. However, when the transistor is nonconductive, the capacitance slowly discharges and the FET is turned off so as to increase the resistance in the feedback path of the amplifier means thereby increasing the gain. When a dark region of extended width or length is detected, the gain of the amplifier is permitted to rise due to the resistance of the fixed resistor in the feedback path to a level approaching white thereby failing to provide a signal which is capable of creating a facsimile of the dark region of extended length or duration.

In commercially available facsimile transmitters manufactured by the assignee of this invention and comprising fiber optics in the optical path between the document and the photodetector and the document and the source of illumination, filters are utilized to improve the response of the transmitter to dark-light variations on the document. However, the filters in such transmitters have not been effective to compensate the spectral response so that all areas which look dark to the eye appear dark to a photocell since the characteristic of the photocell differs substantially from the eye itself. More particularly, the filters of such transmitters have not been extremely effective at filtering out visible red light which is characteristic red ball-point markings. As a consequence, a relatively dark appearing line or mark on a document which is written in red ball-point pen will reflect a sufficient amount of visible red light so that the photodetector does not detect the presence of a dark region.

Commercially available, prior art facsimile transmitters are also somewhat deficient in their speed of response to a dark-light variation in a document. More particularly, an abrupt change from a dark to a light region may not be accurately reflected in the signals which are generated and transmitted by the facsimile transmitter due to the inability of the circuitry to respond to such an abrupt change.

SUMMARY OF THE INVENTION

It is therefore an object of this invention to provide a facsimile transmitter having an automatic gain control which is capable of compensating for a malfunction resulting in the detection of increased darkness by a photodetector while still retaining the capability of accurately detecting a dark region of extended width or length.

In accordance with this object of the invention, a facsimile transmitter for use in producing a copy at one location which is a facsimile of a document located at another location comprises means for illuminating the document, photodetector means in optical communication with the document for detecting dark-light variations in the illuminated document and means for scanning the photodetector means relative to the document. Amplifier means are coupled to the photodetector means for amplifying the photodetector signals and automatic gain control means are associated with the amplifier means for increasing the gain of the amplifier means in response to a lesser amount of light detected by the photodetector means. The gain control means includes adjustable means so as to limit the increase in gain when detecting dark regions and thereby assuring a substantial and continuing difference between transmission signals representing light regions on the document and transmission signals representing dark regions on the document.

In a preferred embodiment of the invention, the automatic gain control means includes a feedback path comprising electronically controlled resistance means in parallel with a variable resistance forming the adjustable means. The electronically controlled resistance means is controlled in response to the detection of a dark region by the detector means so as to increase the shunt resistance across the variable resistance thereby increasing the gain of the amplifier means. The electronically controlled resistance means may comprise a field effect transistor and the gain control means may include a capacitance charging and discharging in response to the detection of dark and light regions by the photodetector so as to control the state of the field effect transistor in response to the charge on the capacitance.

It is another object of this invention to provide a facsimile transmitter having a spectral response which is compensated such that regions appearing dark to the eye on the document are detected as dark regions by the photodetector.

In accordance with this object, the facsimile transmitter comprises filter means in the path of optical communication between the illuminating means and the photodetector for attenuating light in the visible red portion of the spectrum thereby assuring that a dark appearing region on a document which is capable of reflecting visible red light produces a transmission signal representing a dark region.

In a particularly preferred embodiment of the invention, the path of optical communication is formed by fiber optic means and the filter means comprises a gelatin sheet extending substantially transversely to the axis of the fiber optic means. The gelatin sheet is interposed between the photodetector and an end of the fiber optic means. In addition, the filter means may comprise a glass filter in the path of optical communication which is interposed between the illuminating means and end of the fiber optic means.

It is another object of this invention to provide a facsimile transmitter which is capable of accurately responding to abrupt dark-light variations.

In accordance with this object, the amplifier means includes at least one frequency compensating or differentiating network so as to increase the speed of response of the transmitter to abrupt dark-light variations in the document. In the preferred embodiment, the compensating network comprises a parallel RC network.

DETAILED DESCRIPTION OF A PREFERRED EMBODIMENT

Figure 1:
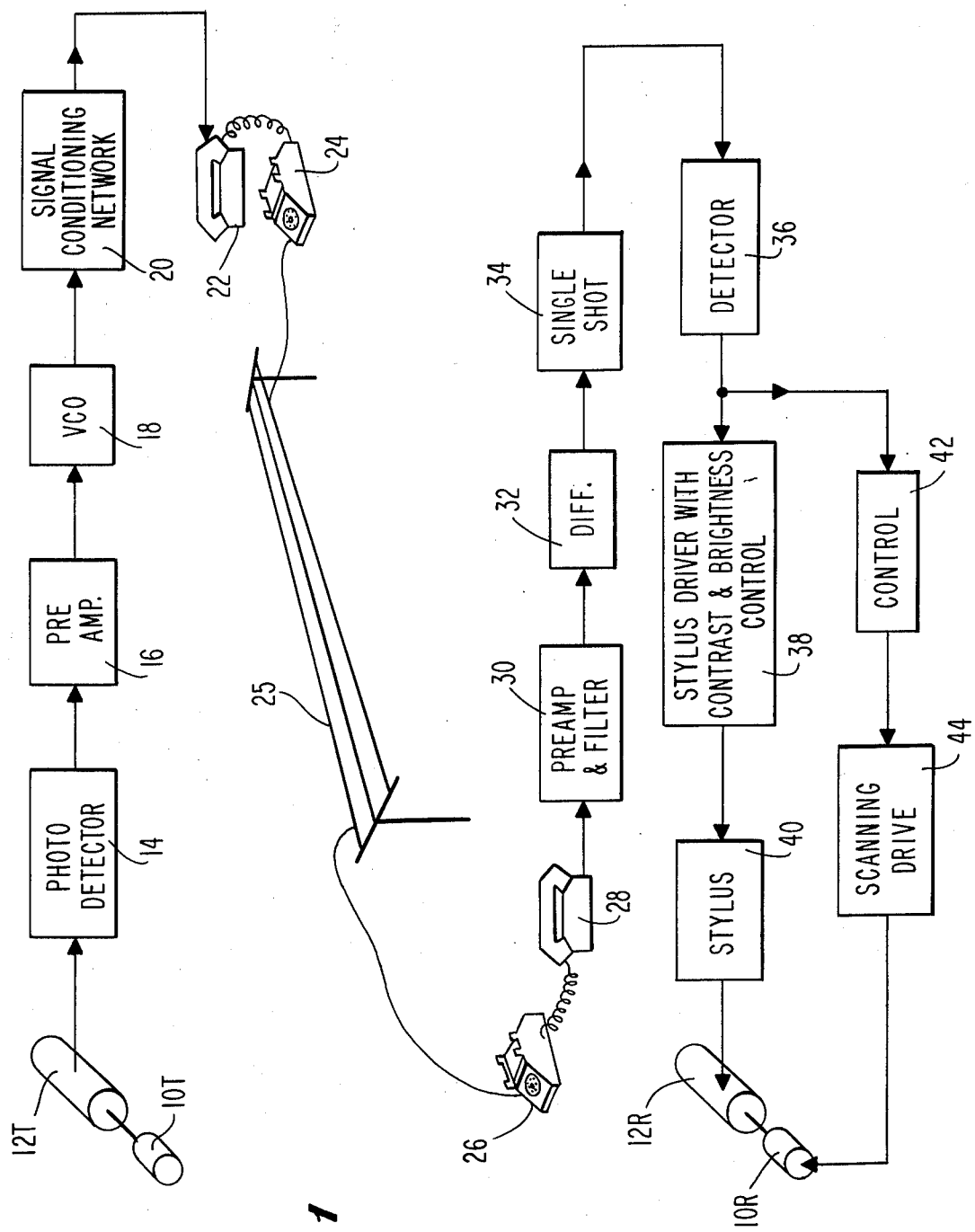
FIG. 1 is a block diagram of a facsimile system depicting a preferred embodiment of the invention.

Referring now to the facsimile system shown in FIG. 1, a facsimile transmitter comprises a drum 12T rotated by a motor 10T so as to create a relative scanning movement between a document carried by the drum 12T and a scanning head not shown. As the scanning head is advanced axially along the drum 12T and the drum rotates about its axis, successive paths on the document are illuminated and variations in light intensity due to the reflectivity and transmissivity of the document are scanned by a photodetector 14.

In accordance with one very important aspect of the invention, filter means are associated with the photodetector 14 for filtering out light in the visible red region of the spectrum. As a consequence, the photodetector 14 is capable of converting variations in light intensity which are a function of the reflectivity of the scanned document into electrical signals representing light and dark regions of the document regardless of the capability of the particular region to reflect light in the visible red region. By filtering out light in the visible red region it is possible to detect dark-light variations in the document representing ball-point pen markings, e.g., red ball-point or other markings which appear dark to the eye but provide a high degree of red reflectivity in the presence of white light.

The electrical signals generated by the photodetector 14 are then amplified at a preamplifier 16. In accordance with another important aspect of the invention, the preamplifier 16 includes an automatic gain control with adjustable means so as to limit the increase in gain when detecting dark regions thereby assuring a substantial and continuing difference between signals representing light regions on the document and signals representing dark regions on the document. In addition, and in accordance with another important aspect of the invention, the amplifier 16 includes frequency compensating or differentiating networks so as to increase the speed of response of the transmitter to dark-light (or light-dark) variations on the document.

The electrical signals which are amplified by the preamplifier 16 are utilized to control a VCO (voltage controlled oscillator) 18 and thereby generate frequency modulated signals representing the information content of the document carried by the drum 12T. The frequency modulated signals are then conditioned by a network 20 before being applied to an acoustical coupler 22 which is associated with a conventional telephone handset 24. A conditioning network 20 in the form of a driver is shown in U.S. Pat. No. 3,850,459 which is incorporated herein by reference.

The frequency modulated signals are then transmitted by suitable means such as conventional telephone lines 25 to a facsimile receiver which is coupled to another conventional telephone handset 26 and an associated acoustical coupler 28.

The transmitted FM signal received at the receiver is amplified by a preamplifier 30 and applied to a differentiating circuit 32 to generate trigger signals which are applied to an FM demodulator comprising a single-shot multivibrator 34 as disclosed in the aforesaid copending application. A detector circuit 36 determines the average DC value of the single-shot output and a writing control signal which is generated at the output of the detector 36 is then applied to a stylus driver. The output from the driver 38 is applied to a stylus 40 associated with a movable head juxtaposed to a copy medium carried by a drum 12R. The relative scanning movement between the copy medium and the head is achieved by rotating the drum 12R by means of a motor 10R.

The output of the detector 36 is also applied to a scanning control circuit 42. The scanning control circuit 42 utilizes the output from the detector 36 to initiate scanning of the copy medium by applying a signal to a scanning drive 44 in response to an FM signal from the transmitter. The output of the scanning drive 44 is applied to the motor 10R. Details concerning the facsimile receiver are set forth in copending application Ser. No. 606,506 filed Aug. 21, 1975 which is incorporated herein by reference.

Figure 2:
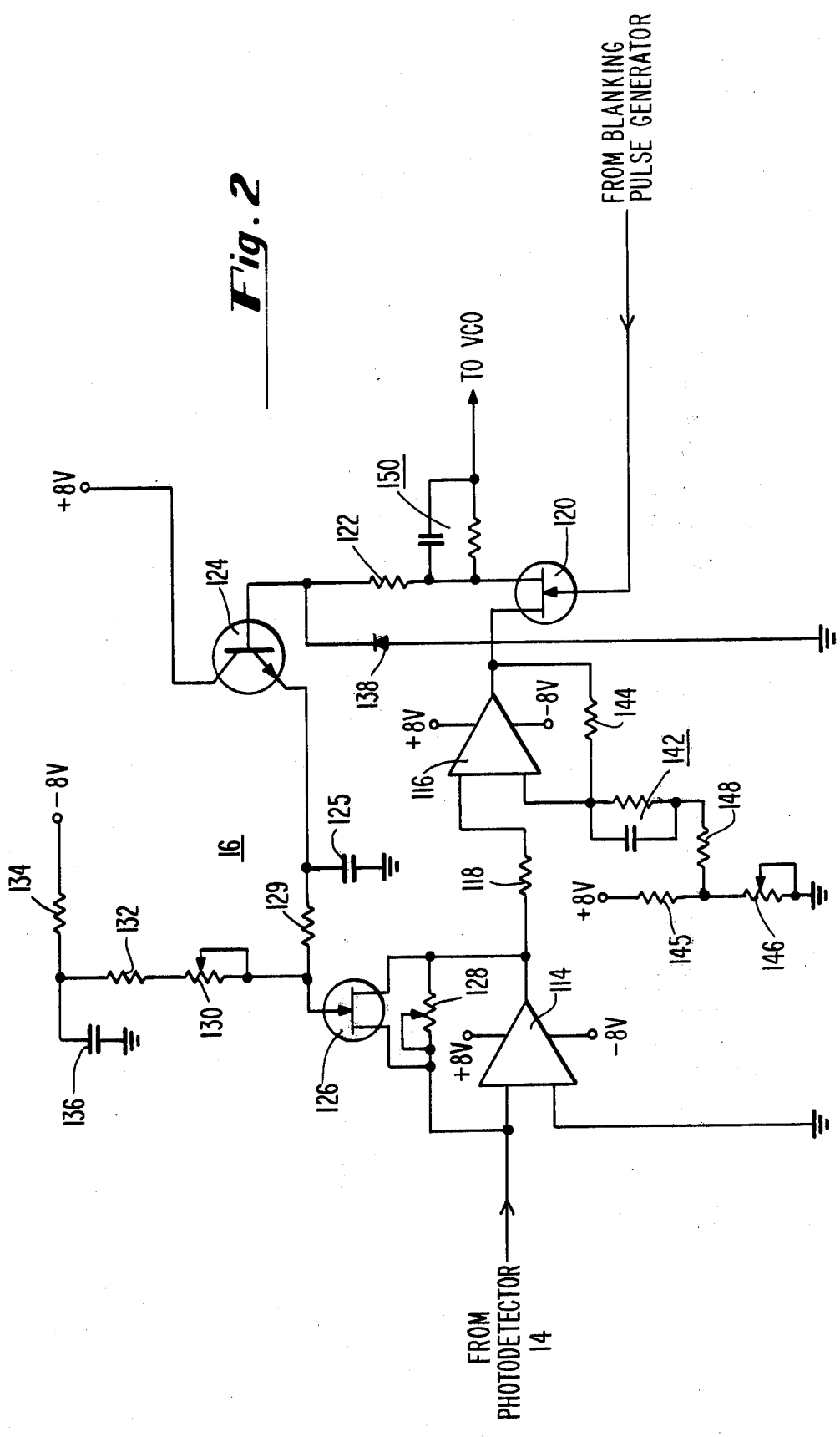
FIG. 2 is a schematic circuit diagram of the transmitter depicted in FIG. 1.

The improved preamplifier 16 of the facsimile transmitter shown in FIG. 1 will now be described in detail with reference to the circuit diagram of FIG. 2. The output from the photodetector 14 is applied to an input terminal of an operational amplifier 114 having an output connected to an input terminal of a succeeding operational amplifier 116 through a resistor 118. The output of the operational amplifier 116 is then applied to the VCO 18 through a field effect transistor 120 coupled to a suitable blanking pulse generator synchronized with the rotation of the drum so as to blank out the effect of a document clamp on the drum 12T.

In order to permit the preamplifier to adjust for a malfunction such as reduced illumination of the document or decreased sensitivity of the photodetector, automatic gain control is provided. As shown in FIG. 2, the automatic gain control includes a feedback path having a resistor 122 connected to the base of a transistor 124 which is appropriately biased by the +8 volt power supply so as to be conductive when the output of the operational amplifier 116 is driven positive in response to the detection of a white or light region on the document. The base of the transistor 124 is connected to ground through a diode 138.

The feedback path of the AGC includes a capacitor 125 connected to the emitter of the transistor 124 so as to be charged to a positive value when the transistor 124 is conductive when a white region is detected. In the absence of a white region, the positive charge on the capacitor is reduced by the −8 volt power supply which is connected to the capacitor through a resistor 129 and a potentiometer 130 in series with resistors 132 and 134. A power supply filter capacitor 136 connects the junction of the resistors 132 and 134 to ground. The charge on the capacitor 125 is utilized to control conduction through a field effect transistor 126 connected in parallel with a potentiometer 128 in the feedback of the operational amplifier 114.

In accordance with this invention, the potentiometer 128 is appropriately set so as to assure that the detection of a dark region of extended length or duration will not result in increase of gain to the point that a dark region, after an extended length of time, will appear as a light region, at least as far as the transmission signal is concerned. In this connection, it will be appreciated that the gain of the operational amplifier 114 is increased when a dark region is detected so that the positive charge on the capacitor 125 may be sufficiently reduced to turn off the transistor 126 and permit the potentiometer 128 to represent a rather substantial resistive feedback path for the operational amplifier 114. On the other hand, when a white or light region is detected, the charge on the capacitor 125 increases to the point of turning the field effect transistor 126 on thereby substantially reducing the total feedback resistance so as to reduce the gain of the operational amplifier 114. In accordance with this invention, the potentiometer 128 is set at a point so that the maximum gain of the operational amplifier is sufficiently limited to produce a transmission signal which at least represents a gray region if not a dark region when a dark region of extended duration is detected.

In accordance with another important aspect of the invention, the preamplifier 16 includes frequency compensating or differentiating networks so as to increase the speed of response of the transmitter to dark-light (or light-dark) variations. In this connection, a lead network 142 is associated with the feedback resistor 144 of the operational amplifier 116. The frequency compensating network 142 includes a parallel RC combination in series with a resistor 148 connected to the junction of a resistor 145 and a potentiometer 146 where the resistor 145 and the potentiometer 146 are connected between the +8 volt power supply and ground.

In addition, the preamplifier 16 includes a differentiating or lead network comprising an RC combination 150 which is connected between the field effect transistor 120 and the VCO circuitry 18 shown in FIG. 1. Other details concerning the facsimile receiver circuitry are shown and described in copending application Ser. No. 417,797 filed Nov. 21, 1973, now U.S. Pat. No. 3,911,207, which is incorporated herein by reference.

Figure 3:
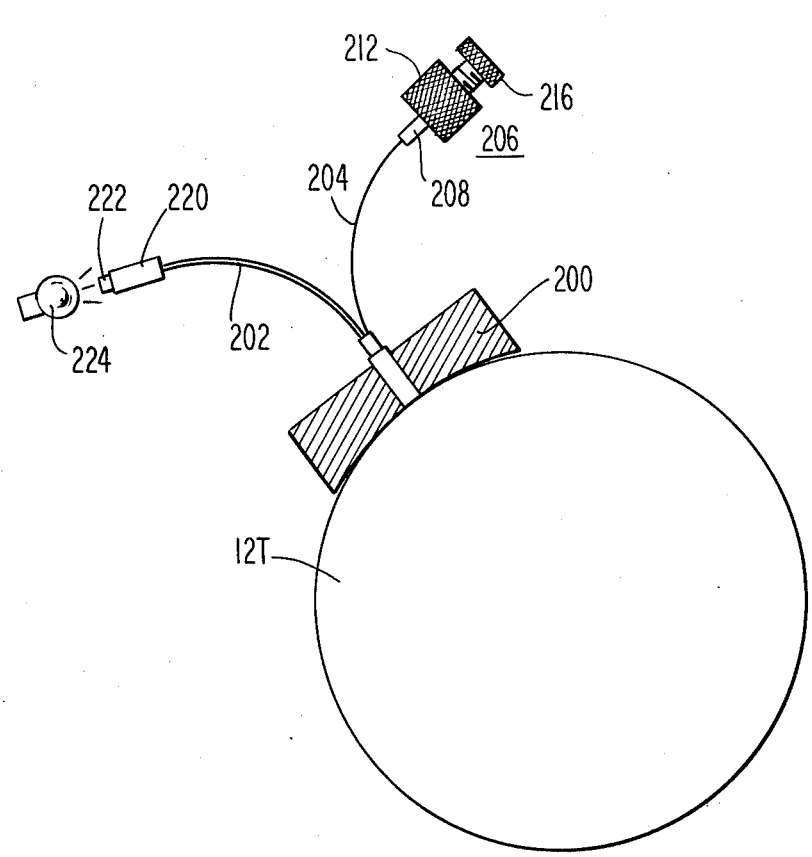
FIG. 3 is a sectional view of a fiber optic-photodetector combination in optical communication with a document on the facsimile transmitter drum shown in FIG. 1.
Figure 4:
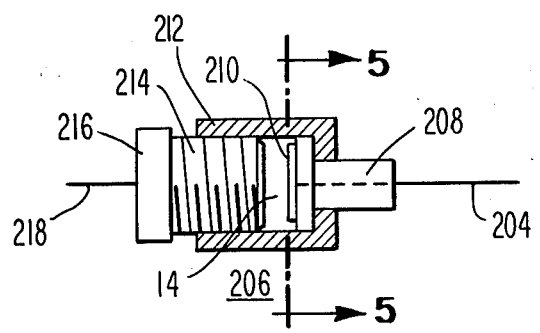
FIG. 4 is an enlarged sectional view of the housing shown in FIG. 3 for a filter and photodetector.

In accordance with another important aspect of the invention, filter means are associated with photodetector 14 which scans the document on the drum 12T. As shown in FIG. 3, a scanning head 200 includes illuminating fiber optics 202 and a reading fiber optic 204 in optical communication with the document on the drum 12T. A reading fiber optic is connected to a photodetector-filter mounting 206 which is shown in section in FIG. 4. The mounting 206 includes a fiber optic holder 208 receiving the fiber optic 204 which is covered at the internal end thereof by a gelatin filter 210 which extends transversely across and in optical communication with the fiber optic 204 on the interior of the mounting 206. In the preferred embodiment of the invention, the gelatin filter 210 comprises a No. 38 Wratten gelatin filter manufactured by Eastman Kodak. The photodetector 14 is then mounted adjacent and in optical communication with the reading fiber optic 204 through a gelatin filter 210 at the interior of a jacket 212. The photodetector 14 is held in place by a threaded member 214 having a knurled finger grip 216. The leads 218 for the photodetector 14 extend through the member 214 to the operational amplifier 114 as shown in FIG. 2.

Figure 5:
FIG. 5 is a view taken along line 5—5 of FIG. 4.

FIG. 5 shows a sectional view of the mounting 206 where the fiber optic 204 is seen through the gelatin filter 210. It has been found that the gelatin filter 210 may be conveniently cemented on the end of the fiber optic holder 208. After cementing, the mounting may be assembled to the condition shown in FIG. 4.

As shown in FIG. 3, the illuminating fiber optics 202 extend into a jacket 220 having a glass filter 222 at the end thereof adjacent the illuminating means or light source 224.

It will therefore be appreciated that the filter means includes a gelatin filter as well as a glass filter located in the path of optical communication between the illuminating means and the photodetector with the document being located at an intermediate point in that optical path. More particularly, the gelatin filter 210 is interposed between the photodetector and the end of the fiber optic means at one end of the path of optical communication and the glass filter 222 is interposed between the light source 224 and the other end of the fiber optic means in the path of optical communication.

Figure 7:
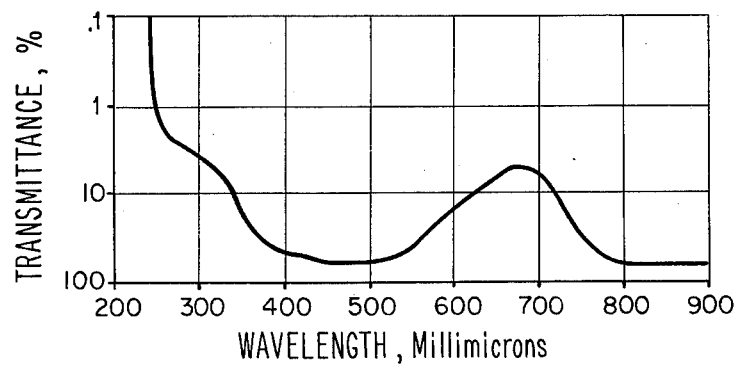
FIG. 7 is a filter characteristic for a gelatin filter utilized in a preferred embodiment of the invention.

In accordance with this invention, the gelatin filter 210 substantially attenuates light in the visible red region, i.e., light in the range of 625 to 725 millimicrons. In this connection, FIG. 7 shows the transmission characteristic of the gelatin filter as a function of wavelength. As the frequency increases above 625 millimicrons, the transmittance of the filter increases reaching a minimum at approximately 500 millimicrons. In the violet region above 450 millimicrons, the transmittance decreases rapidly.

Figure 8:
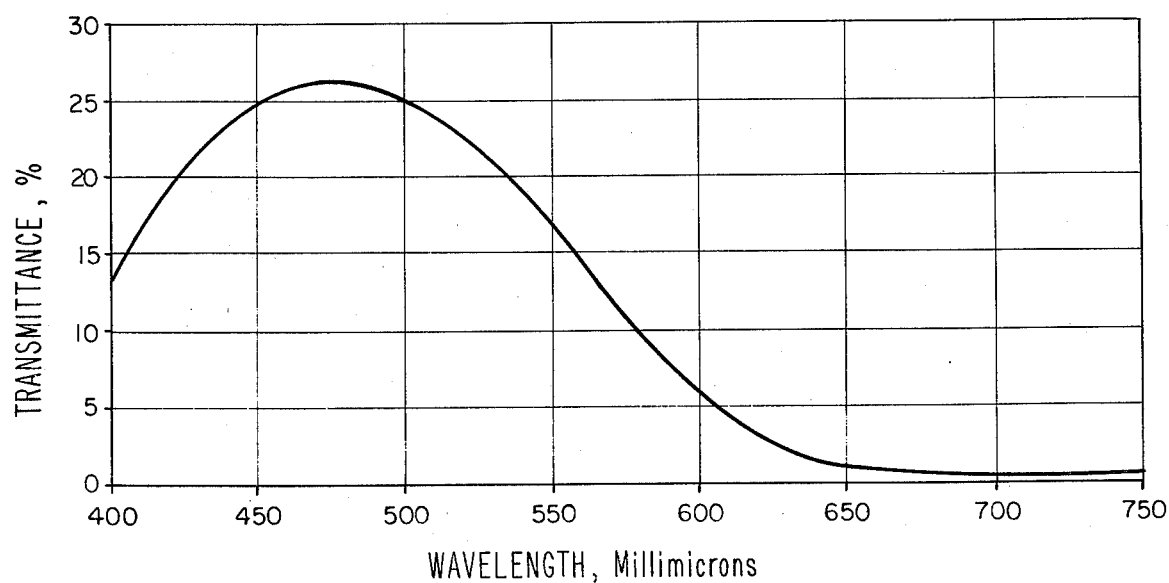
FIG. 8 is a filter characteristic for a glass-gelatin filter combination utilized in a preferred embodiment of the invention.

In further accordance with this invention, the gelatin filter 210 is combined with the glass filter 222 to achieve the transmission characteristic shown in FIG. 8. It will be noted that the glass filter increases the transmittance in the 400–600 millimicron visible region to achieve the combined characteristic of FIG. 8. In addition, the glass filter also attenuates light in the near infrared range such as that associated with blue ballpoint. Because of the attenuation achieved by the gelatin filter 210 in combination with the glass filter 222, regions of a document which appear dark to the eye will be sensed as dark by the photodetector even though visible light in the red range as well as infrared light is reflected from those regions.

It is also possible to combine the glass filter and the gelatin filter into a single filter at one point in the optical path. It is further possible to incorporate the desired filter characteristics in the fiber optics themselves and completely eliminate the gelatin filter and the glass filter. In the alternative, the light source 224 may be properly chosen so as to limit or reduce the amount of visible red and infrared light which reaches the photodetector.

Details concerning the relationship of the fiber optics to the document on the drum 12T are disclosed in copending application Ser. No. 533,194, now abandoned, filed Dec. 16, 1974 which is incorporated herein by reference.

Figure 6:
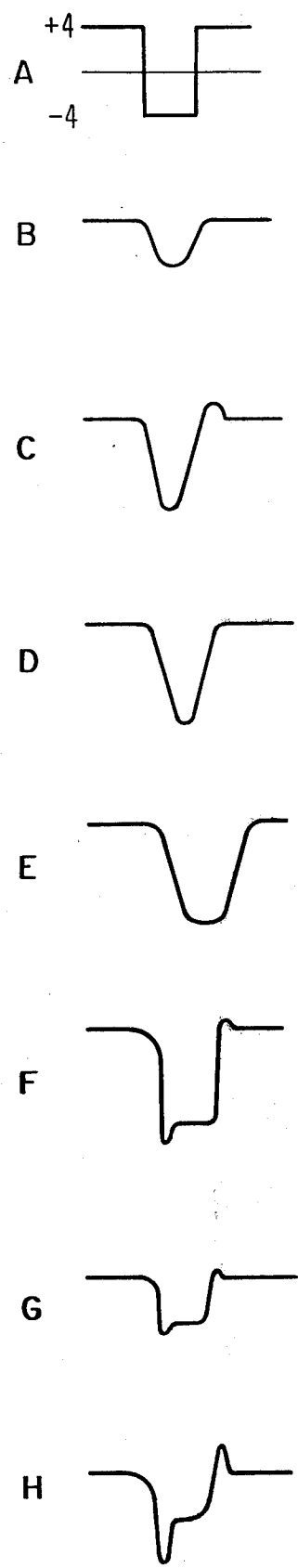
FIG. 6 is a waveform diagram utilized in explaining the improvements afforded by the circuit of FIG. 2.

Reference will now be made to the waveforms of FIG. 6 to illustrate the effectiveness of the circuitry in FIG. 2.

The waveform $a$ indicates the electrical signal response at the output of the amplifier 114 for an ideal system upon detecting a narrow width black line with sharp well-defined edges which this invention seeks to simulate. Waveform $b$ indicates the response from the same narrow line through a standard uncompensated amplifier and optical system, and waveform $c$ is the response through the compensated amplifier 116 in accordance with this invention. It will be noted that the white or black transition slope is steeper and the amplitude is greater in waveform $c$ than in waveform $b$ thus achieving a full black condition in a shorter period of time thus providing better resolution of the well-defined edge on the scanned fine line on the original document. The black-to-white transition is also steeper providing an improved resolution on the black-to-white transition. The white overshoot does not reduce copy quality since whiter-than-white signals are simply printed as white. The reduced amplitude of the waveform $b$ is due primarily to the resolving power of the optics.

In the case of waveform $b$, the circle of least confusion or optical aperture at the end of the fiber optic 204 exceeds the width of the black line being scanned. In waveform $d$, the circle of least confusion is approximately equal to the black line and in waveform $e$ the circle of least confusion is less than the black line. It will be noted that the slope from white-to-black and black-to-white in waveforms $b$, $d$ and $e$ is equal.

In accordance with one important aspect of this invention, the amplifier compensating network 142 momentarily increases the gain of the operational amplifier 116 on the steeper leading and trailing edges so as to produce the waveform $c$. A wide black line through the compensated amplifier would provide the waveform $f$ and a wide gray line with sharp leading and trailing edges would produce waveform $g$.

In accordance with another important aspect of the invention, the second compensating network 150 comprising a parallel RC combination, provides improved gray scale while preserving the higher gain two-level operation necessary for improved quality of fine printed material such as 6-point type. The resistor value of the network 150 is chosen such that a wide medium gray mark on the scanned document produces the desired medium gray print on the copy medium.

The video voltage applied to the VCO is shown in waveform $h$. It will be noted the initial transition from white to gray produces a brief overshoot to the black region. The width of this black pulse is sufficient to span the width of narrow strokes in small type so that essentially two-level operation exists until the capacitor of the network 150 becomes charged at which time the network acts only as a resistive attenuator as long as the video voltage level remains substantially constant through the remainder of the gray area. Black and white followers are produced as is typical with heavy video peaking. However, printed copy quality is enhanced while preserving a reasonable gray scale of approximately five levels.

It will therefore be understood that the electrical response of the transmitter section including the photodetector and the voltage controlled oscillator is sufficiently fast to follow the black-white changes in light level into the photodetector. Of course, the rate at which the light level on the sensitive area of the photocell changes is primarily a function of optics. The above-described compensating networks in effect reduce the optical aperture or circle of least confusion thus improving the overall resolution of the system.

The AGC portion of the system does not contribute to improved resolution; however, it does establish and maintain a white reference level by making adjustments in amplifier gain over a limited range. The AGC circuit also maintains a fixed amplifier output voltage representing white thus establishing a point from which to start in determining the various shades of gray continuing into the black region. The time constant of this circuit is such that a white level is quickly sensed and stored in the capacitor 125 to establish a gain sufficient to provide the desired white video voltage output from operational amplifier 116. This gain is then held reasonably constant for the remainder of the horizontal scan line. The amplifier gain will slowly increase after the first horizontal scan line in the absence of white on the scanned document.

Although specific circuitry and systems have been shown and described, it will be understood that various changes and modifications may be made without departing from the true spirit and scope of the invention as set forth in the appended claims.

What is claimed is:

1. A facsimile transmitter for use in producing a copy at one location which is a facsimile of a document at another location comprising:

means for illuminating the document;

photodetector means in optical communication with the document for detecting dark-light variations between dark regions and light regions in the illuminated document, said photodetector means generating a signal representing said dark-light variations;

means for scanning said photodetector means relative to said document;

amplifier means coupled to said photodetector means for amplifying said photodetector signals; and automatic gain control means associated with said amplifier means including electronically controlled means responsive to the output of said amplifier means for increasing the gain of said amplifier in response to a lesser amount of light detected by said photodetector means when detecting dark regions, said gain control means also including adjustable means which may be set so as to limit the increase in gain by said electronically controlled means when detecting dark regions for extended duration thereby assuring a substantial and continuing difference between transmission signals representing light regions on said document and transmission signals representing dark regions on said document.

2. The facsimile transmitter of claim 1 wherein said automatic gain control means includes a feedback path comprising said electronically controlled means comprises a controlled resistance means in parallel with said adjustable means comprising a variable resistance, said controlled resistance means being controlled in response to the detection of a dark region by said photodetector means so as to increase the gain of said amplifier means.

3. The facsimile transmitter of claim 2 wherein said controlled resistance means comprises a field effect transistor.

4. The facsimile transmitter of claim 2 wherein said automatic gain control means includes a capacitance charging and discharging in response to the detection of dark and light regions by said photodetector so as to control the state of said controlled resistance means in response to the charge on said capacitance.

5. The facsimile transmitter of claim 1 further comprising a frequency compensating network coupled to said amplifier means to increase the speed of response of said transmitter to dark-light variations in said document.

6. The facsimile transmitter of claim 5 wherein said frequency compensating network comprises a parallel RC network.

7. The facsimile transmitter of claim 1 comprising filter means in the path of optical communication between said illuminating means and said photodetector for attenuating light in the visible red portion of the spectrum thereby assuring that a dark appearing region a document which is capable of reflecting visible red light produces a modulated transmission signal representing a dark region regardless of the reflection of visible red light.

8. The facsimile transmitter of claim 7 further comprising fiber optic means in said path of communication.

9. The facsimile transmitter of claim 8 wherein said filter means comprises a gelatin sheet extending substantially transversely to the axis of said optic means.

10. The facsimile transmitter of claim 9 wherein said filter means is interposed between said photodetector and the end of said fiber optic means extending between said document and said photodetector means.

11. The facsimile transmitter of claim 9 wherein said filter means further comprises a glass filter in said path of optical communication.

12. The facsimile transmitter of claim 11 wherein said glass filter is interposed between said illuminating means and said end of said fiber optic means extending between said document and said illuminating means.

13. A facsimile transmitter for use in producing a copy at one location which is a facsimile of a document at another location comprising:

means for illuminating the document;

photodetector means in optical communication with the document for detecting light reflected from the illuminated document including light in the visible red region, said photodetector means generating signals representing reflected light variations;

means for scanning said photodetector means relative to said document;

amplifier means coupled to said photodetector means for amplifying said photodetector signals;

modulator means coupled to said amplifier means for generating modulated transmission signals representing said dark-light variations on said document;

fiber optic means in the path of optical transmission from said illuminating means to said document and from said document to said photodetector means; and means for substantially limiting light in the visible red region of the spectrum from reaching said photodetector means so as to permit detection of a relatively dark appearing region even though said dark appearing region is capable of reflecting a substantial amount of light in said visible red region.

14. The facsimile transmitter of claim 13 wherein said means for substantially limiting comprises filter means for attenuating light in the visible red region.

15. The facsimile transmitter of claim 14 wherein said filter means extends substantially transversely to the axis of said fiber optic means.

16. The facsimile transmitter of claim 15 wherein said filter means comprises a gelatin sheet extending substantially transversely to the axis of said fiber optic means.

17. The facsimile transmitter of claim 16 wherein said gelatin sheet is interposed between said photodetector means and said adjacent end of said fiber optic means.

18. The facsimile transmitter of claim 17 wherein said filter means further comprises a glass filter interposed between said illuminating means and the adjacent end of said fiber optic means for substantially attenuating infrared light.

* * * * *